(No Model.) 4 Sheets—Sheet 1.
S. WASHINGTON.
FEEDING AND WEIGHING APPARATUS.
No. 488,101. Patented Dec. 13, 1892.
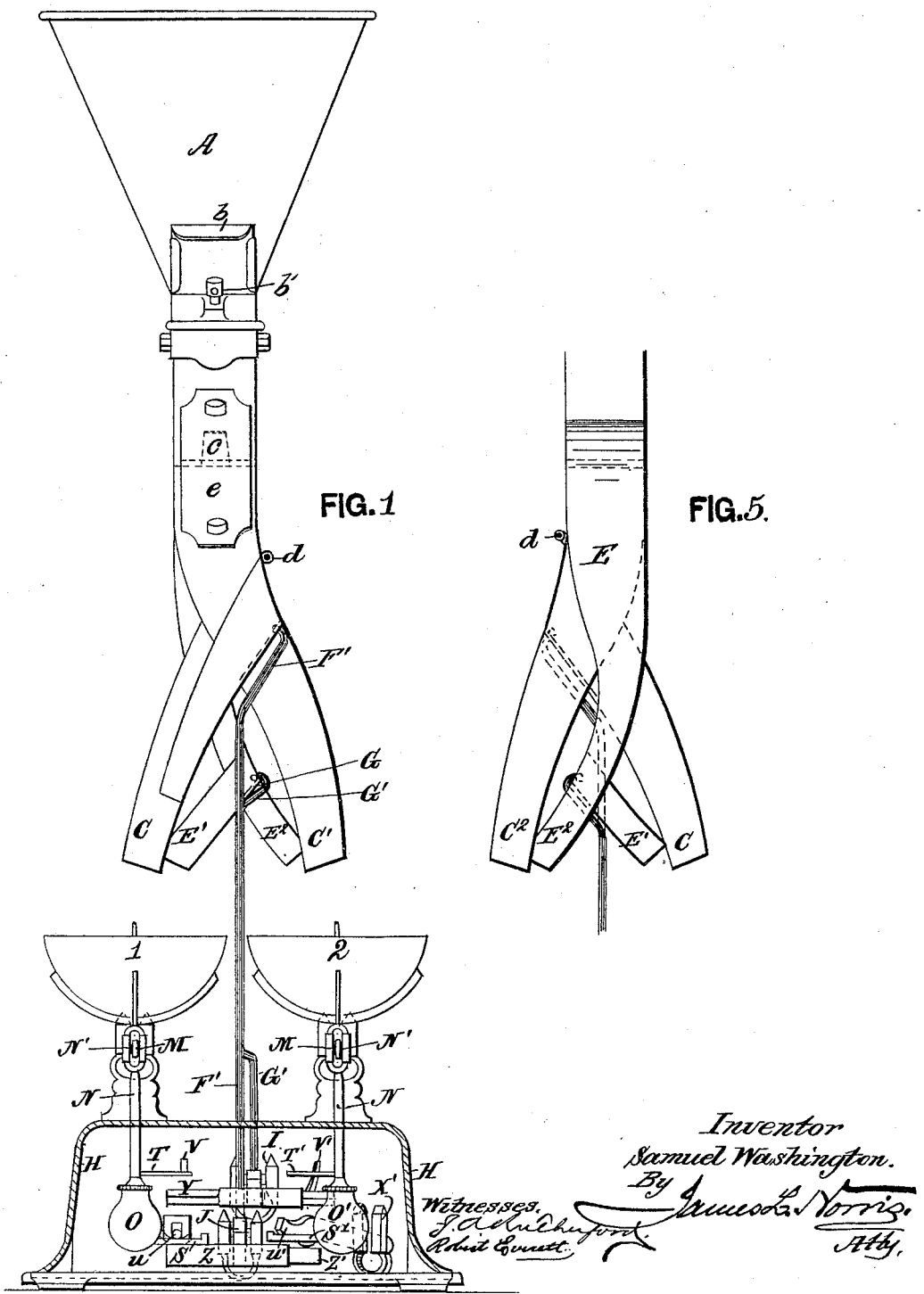

(No Model.) 4 Sheets—Sheet 2.
S. WASHINGTON.
FEEDING AND WEIGHING APPARATUS.
No. 488,101. Patented Dec. 13, 1892.
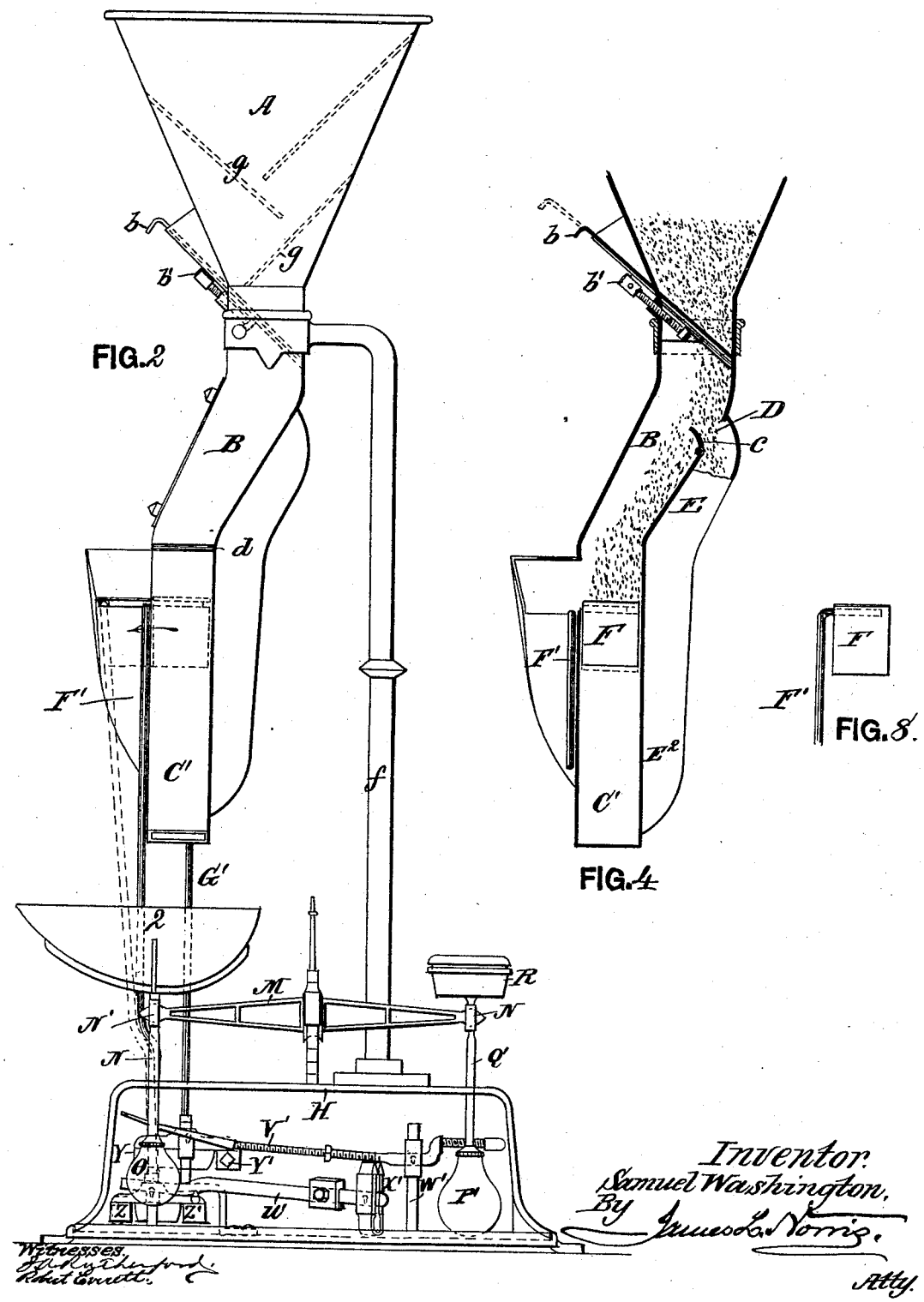

(No Model.) 4 Sheets—Sheet 3.
S. WASHINGTON.
FEEDING AND WEIGHING APPARATUS.
No. 488,101. Patented Dec. 13, 1892.
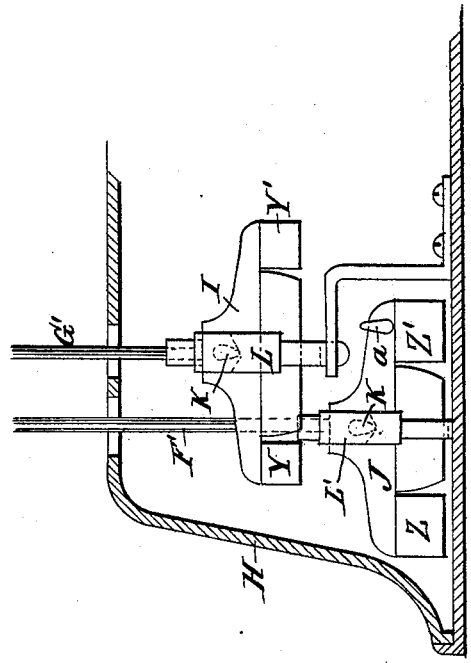
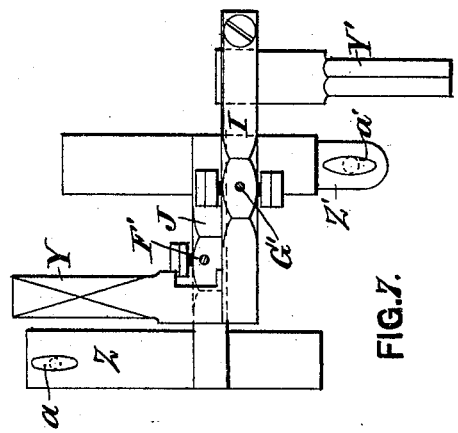
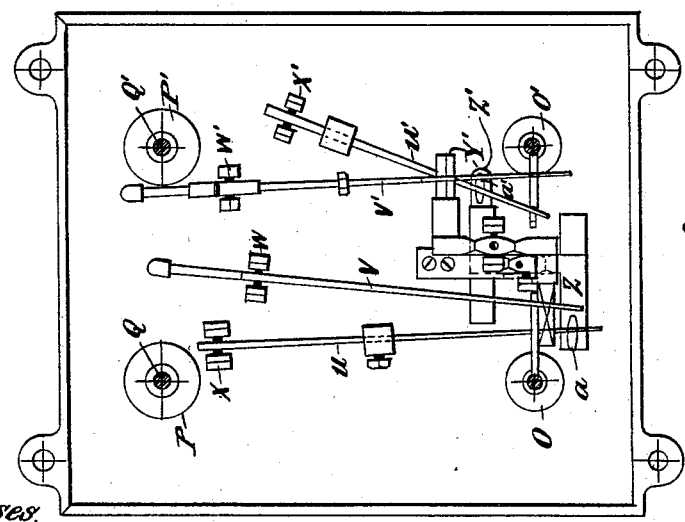

(No Model.) 4 Sheets—Sheet 4.
S. WASHINGTON.
FEEDING AND WEIGHING APPARATUS.
No. 488,101. Patented Dec. 13, 1892.
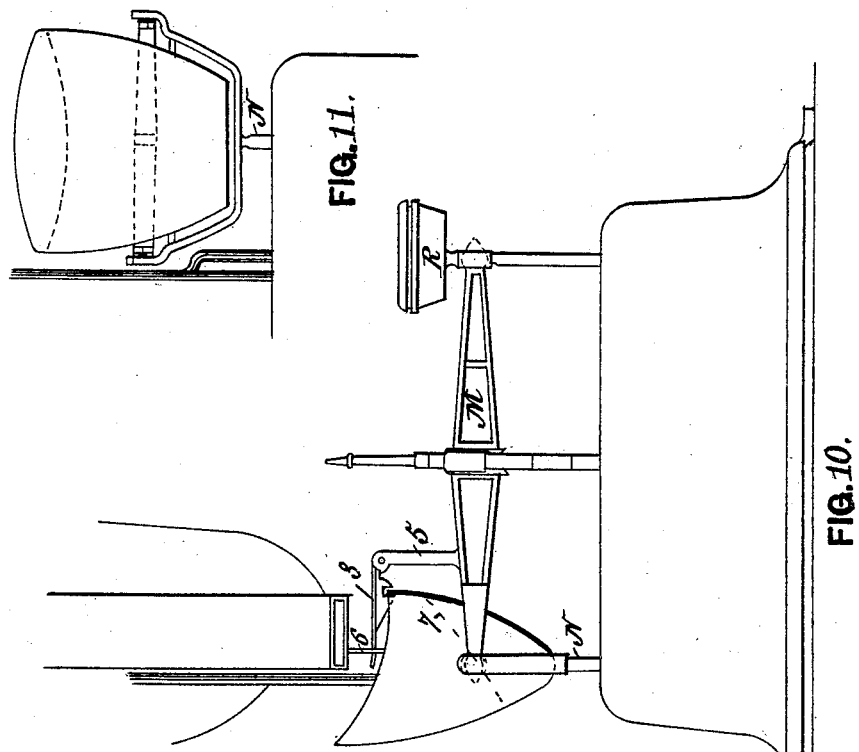
FIG. 11.
FIG. 10.
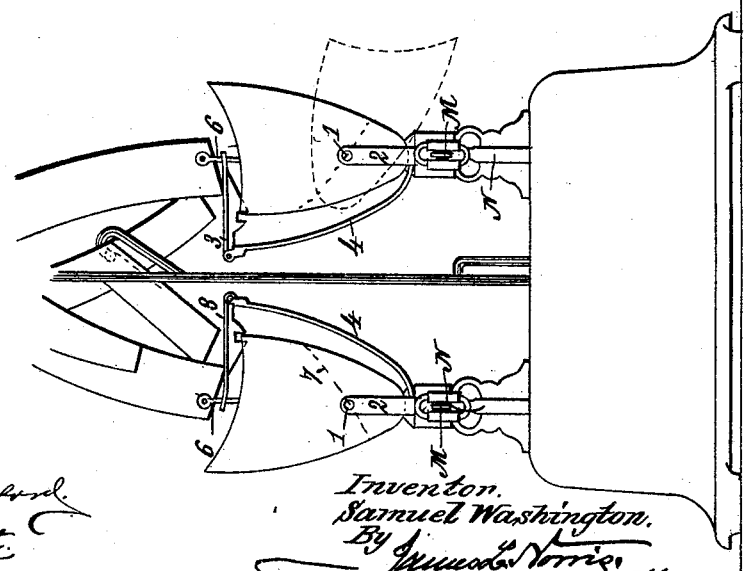
FIG. 9.
Witnesses.
J. A. Rutherford.
Robert Everett.
Inventor.
Samuel Washington.
By Minor L. Norris,
Atty.

UNITED STATES PATENT OFFICE.

SAMUEL WASHINGTON, OF HARPURHEY, ASSIGNOR TO HIMSELF, JOHN CANDIDO SEQUEIRA, OF MANCHESTER, AND THOMAS ALDCROFT SCHOLES, OF ECCLES, ENGLAND.

FEEDING AND WEIGHING APPARATUS.

SPECIFICATION forming part of Letters Patent No. 488,101, dated December 13, 1892.

Application filed July 18, 1892. Serial No. 440,438. (No model.)

*To all whom it may concern:*

Be it known that I, SAMUEL WASHINGTON, a subject of the Queen of Great Britain and Ireland, residing at Oaklands, Harpurhey, in the county of Lancaster, England, have invented new and useful Improvements in Weighing Apparatus, of which the following is a specification.

My invention relates to machines for automatically weighing tea, sugar, and other substances in large or small quantities, in which a plurality of scale-pans is used; and it has for its object to provide novel and simple means for accurately and automatically controlling the operations of such machines.

To this end my invention consists in the novel construction, combination, arrangement, and operation of parts hereinafter described and claimed, reference being had to the accompanying drawings, in which—

Figure 1 is a front elevation of my improved weighing-machine adapted for weighing sugar, coffee, and other loose or finely-divided substances, with the base or cover shown in section to make the internal mechanism more clear. Fig. 2 is a side elevation of Fig. 1, and Fig. 3 is a plan view of the base alone with the cover removed. Fig. 4 is a sectional view, and Fig. 5 is a rear view of the spout portion only. Fig. 6 is a partial central section through the base of the apparatus, showing the valve-controlling mechanism-operating devices in side elevation. Fig. 7 is a detail top plan of such device. Fig. 8 is a detail view of one of the valves. Fig. 9 is a front view illustrating a partial construction of dumping scale-pans and adjacent mechanism. Fig. 10 is a side view of a different form of such scale-pans and mechanism, and Fig. 11 is a front view thereof.

In the said drawings, the letter A designates a hopper to receive or contain the sugar or other substance to be weighed, the outlet-orifice of which opens into an inclined spout or shoot B, terminating in two separate arms or branches C and C', leading to the two scale-pans 1 and 2, and the letter *b* indicates a slide-controlling communication between the hopper and the inclined spout. On the under side of the spout B, I make an opening D, underneath which I affix a small hopper or receiver E, terminating in two separate arms E' and E², leading to the scale-pans 1 and 2. At the junction of the two arms C and C' and the supplementary arms E' and E² valves F and G are situated for directing the flow of material through one or other of the two arms, as required. These valves consist of small pieces of thin sheet metal (seen more clearly in Fig. 8) secured to the cranked extremities of rods F' and G', extending downward into the casing H and terminating in small rocking beams I and J, riding on knife-edge centers K in bearings L and L'.

The scales are preferably made to carry the scale-pans above the beams M by means of vertical arms N, riding upon centers N' and extending below the scale-beams into the casing H, as illustrated, and which arms are provided with weights O and O' to keep them in a vertical position and formed at their upper ends to receive the scale-pans, which rest upon them, and which arms and weights are counterbalanced by similar weights P and P', vertical arms Q and Q', and weight-pans R at the opposite ends of the beams. In some cases the vertical arms and weights may extend through the bottom of the casing to give greater steadiness to the scale-pans.

From each of the weights O and O' extend pins or projections S and S', as do also pins or projections T and T' from the vertical arms N, those on the weights when the scales are empty serving to support the free ends of the weighted levers U and U', and those on the arms serving to support the free ends of the weighted levers V and V'. The weighted levers U and U' and V and V' are each pivoted on knife-edge centers in bearings W and W' and X and X', rising from the base-plate. The rocking beam I, connected with the valve G through the rod G', is provided with two arms Y and Y', (see side elevation, Fig. 6, and plan view, Fig. 7,) extending beneath the two weighted levers V and V', and the rocking beam J, connected with the valve F through the rod F', is provided with two arms Z and Z', extending beneath the weighted levers U and U', the extremities of such arms Z and Z' being furnished with curved knifeedges $a\ a'$, on which the levers U and U' ride when lowered by the falling of the weights O and O', while the extremities of the arms Y and Y' are squared to receive the levers V and V', when also lowered by the falling of the weights O and O'. Sugar or other material being supplied to the hopper and the regulating-slide $b$ being drawn out, the stream flows into the scale-pan 1 through the large inclined spout B and arm or branch C, as illustrated in Figs. 1 and 4, a portion of such stream passing through the opening D into the scale-pan through the spout E and arm E' in a fine auxiliary stream. As soon now as a quantity slightly less than the weight required has run into the scale-pan 1, the rod N and weight O commence to move downward, and in so doing lower the lever U onto the arm Z of the lower rocking beam J, and which lever U, bearing upon this arm, causes the valve F to move in the direction of the arrow and into the dotted position shown in Fig. 2, and so divert or allow the main stream to run into scale-pan 2 by way of spout C'. The auxiliary stream continues to flow into scale 1 until the requisite weight is made up and the scale moves farther downward, when the lever V falls, and by its weight depresses the arm Y, immediately tilting the upper rocking beam I, operating the valve G, so allowing or causing the auxiliary stream also to run into 2 scale through spout $E^2$. The same cycle of operations occurs with respect to scale 2—that is, the material now flows through spout C' into scale 2 and the auxiliary stream through spout $E^2$ until the desired quantity is reached when the arms Z' and Y' under the action of levers V' and U' tilt the rocking beams back again, and meanwhile scale 1 being emptied of its contents the flow of material is thus again directed into it by the movement of scale 2, and so on alternately.

It will be obvious that no pause or loss of time takes place in the weighing operation for as soon as the main stream is diverted from falling into one pan the weighing immediately proceeds into the other pan while the auxiliary stream completes the weighing in the first scale.

It will be apparent that the valves F and G are clear of the spouts and do not touch or bear upon them in any wise and that the rocker-beams are mounted on knife-edge centers, thus avoiding all friction in the diverging operation and securing great delicacy in weighing, which is a distinguishing feature of my invention.

In weighing some substances—such as tea— the hopper A is provided with sloping divisions $g$ (seen dotted in Fig. 1) to spread out the tea and form it into thin layers. To regulate the flow of the auxiliary stream into the hopper E, I provide an adjustable tongue or deflector $c$ and to regulate the opening presented by the outlet orifice of the hopper A, I provide the slide $b$ with an adjustable nut $b'$, which serves to set the shutter at any desired degree of opening. To assist in the examination of the internal parts, the cover of the arm C' is hinged at $d$ to afford facilities for setting the tongue or deflector $c$ the spout B is provided with an opening covered by a plate $e$.

The hoppers and spouts are supported from the base of the machine by an upright pillar $f$, or the same may be supported in any other convenient manner, and the arms F' and G', connected with the valves F and G, may be inclosed within a casing to prevent damage being done to the same.

In some cases the scoops are arranged to automatically discharge themselves, in which case they are formed of a bucket-shape (see Figs. 9, 10, and 11) and are mounted upon pins or pivots 1 in the frame 2, attached to the scale-beam, and which scoops are so mounted as to always assume a vertical position. As the scoops begin to fill they tend to cant over owing to the accumulation of the substance above the center of oscillation, but are prevented from doing so by a drop-latch 3, supported (in the case of Fig. 9) by an arm 4, forming part of the frame 2 or (in the case of Figs. 10 and 11) supported by an upright 5, which engages with the top edge of the scoop as illustrated until the weighing operation is completed. As soon as the scale end moves downward the scoop and latch aforesaid are simultaneously lowered until the auxiliary or minor stream is cut off, when the latch 3 is caught by the cranked extremity of the wire projection 6 depending from the spout above and the scale descending still further trips the latch, thereby allowing the scoop to cant over and discharge its contents onto the paper or hopper placed to receive them. As soon as the contents are discharged the scoop instantly rights itself and in so doing the edge of the scoop raises the latch aforesaid and the scoop is again retained in its vertical position. The interior of each scoop is provided with a sloping bottom 7 to cause the substance to accumulate at the tilting side of the scoop.

In my invention the valves are actuated by the action of the scales, and this is a very important feature, as it insures great accuracy in weighing by allowing the valves to come into play only at the instant the required quantity of substance has fallen into the pans, the valves remaining perfectly still while the pans are filling instead of being unsteady and tending to divert the stream as soon as a small quantity of the material has passed into the pans, as in machines with the valves operated by direct connection with the scale-beam.

What I claim is—

1. In an automatic weighing apparatus, the combination, with a spout or chute comprising two main branches, of auxiliary spouts or chutes operatively connected therewith for diverting the stream fed to the scale-pans into a major and minor stream, substantially as described.

2. In an automatic weighing apparatus, the combination, with a spout or chute comprising two main branches, of auxiliary spouts or chutes operatively connected therewith for diverting the steam fed to the scale-pans into a major and minor stream, and valves for diverting the stream from one branch of the said chute or spout to the other, substantially as described.

3. In an automatic weighing apparatus, the combination, with a spout or chute comprising two main branches of auxiliary spouts or chutes operatively connected therewith, and valves operated by the action of the scales for controlling the flow of material to be weighed, substantially as described.

4. In an automatic weighing apparatus, the combination, with a spout or chute comprising two main and two auxiliary branches, of vertical arms connected to the scale-beams and carrying the scale-pans, pins or projections extending from said vertical arms, of weighted levers resting upon said pins or projections, and valves in operative contact with said weighted levers for controlling the flow of the material to be weighed, said levers being operated to open and close the valves, substantially as described.

In testimony whereof I have hereunto set my hand in the presence of two subscribing witnesses.

SAMUEL WASHINGTON.

Witnesses:
  WALTER GUNN,
  EDMUND WILSON.